May 22, 1956  N. KASDAN  2,746,462
LADY'S FACE POWDER COMPACT
Filed Nov. 27, 1951
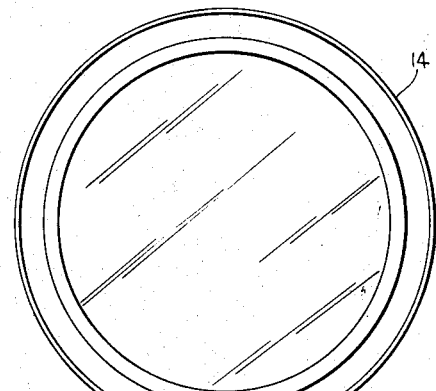
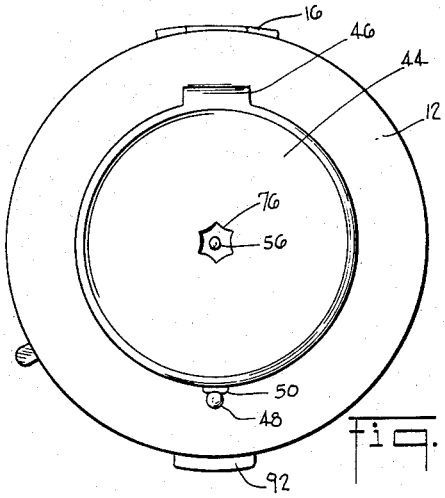
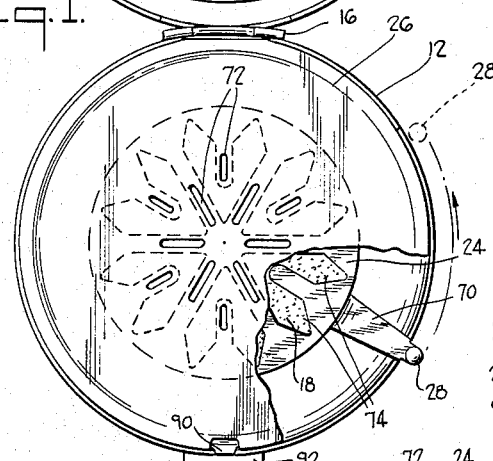
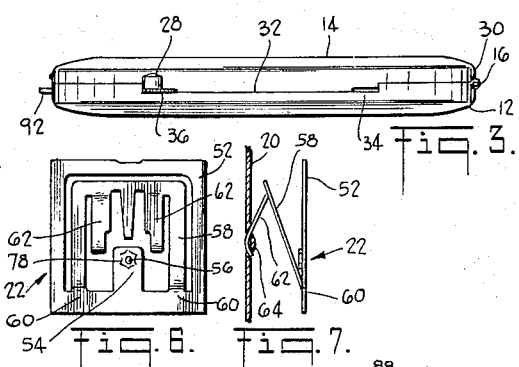
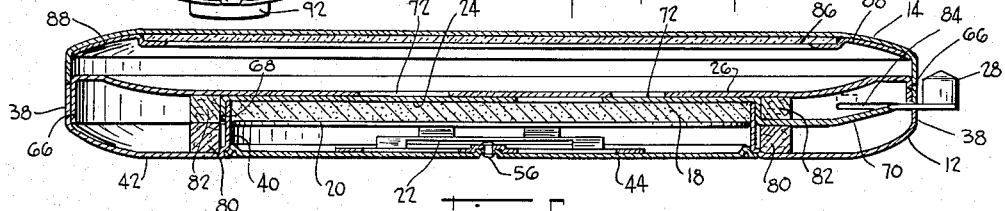
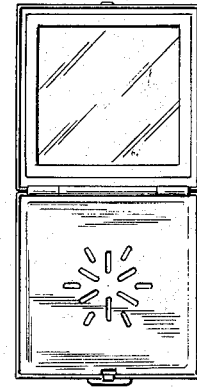
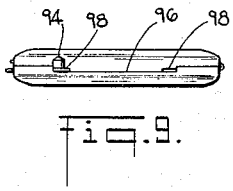
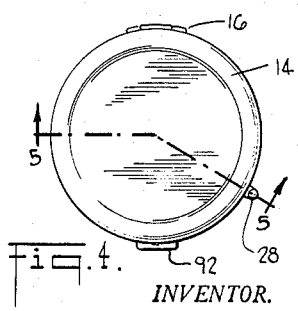
INVENTOR.
NATHAN KASDAN
BY
ATTORNEYS United States Patent Office 2,746,462
Patented May 22, 1956

2,746,462

LADY'S FACE POWDER COMPACT

Nathan Kasdan, Plainfield, Conn., assignor to Majestic Metal Specialties, Inc., Moosup, Conn., a corporation of Connecticut Application November 27, 1951, Serial No. 258,457

8 Claims. (Cl. 132—83)

This invention relates to compacts, and more particularly to a so-called "dispensing compact," that is, one having controlled delivery of loose powder.

The primary object of the present invention is to generally improve compacts of the type specified. Such compacts commonly employ a movable plate or "agitator," and a handle for moving the same. For convenience and accessibility the handle is preferably exposed at the outside of the case, but that introduces a disadvantage in that it may be accidentally or unintentionally moved even when the case is closed. For instance, it may be jostled while being carried along with other articles in a handbag. Later when the case is opened there may be unexpected spillage of a quantity of stray powder.

One object of the present invention is to overcome the foregoing difficulty, and with this object in view the compact is provided with lock means to secure the handle in position and thus to prevent unintentional movement thereof. A more detailed object is to automatically lock the handle when the case is closed, and to release the handle when the case is opened, and to this end the lock is preferably formed on the cover. More specifically, the edge wall of the cover projects downwardly into the path of travel of the handle, but is cut away at one or more points to receive the handle, thereby locking the same. These cutaway points are preferably located at the ends of the permitted range of travel of the handle, this being of particular advantage when dealing with a rectangular case, for the handle then projects from the casing a substantial amount when in the center of its motion, but comes close to the casing at the ends of its motion.

The loose powder is preferably urged upward by a pressure plate and spring. I have found that oscillation of the agitator is ineffective if the solid body of compacted powder and the pressure plate are permitted to turn bodily with the agitator. On the other hand, effective operation is obtained if the pressure plate is held against rotation, and in accordance with a further feature and object of the invention, the compact is provided with means to prevent rotation of the pressure plate. In preferred form a spring bears upwardly against and is secured to the pressure plate, and I provide means to prevent rotation of the spring. This is preferably done by providing a polygonal depression in the door of the powder compartment, said depression mating with a polygonal depression in the spring, in which case the parts may be held together by a single center rivet.

To accomplish the foregoing objects, and others which will hereinafter appear, my invention resides in the powder case elements and their relation one to another, as are hereinafter more particularly described in the following specification. The specification is accompanied by a drawing in which:

Fig. 1 is a plan view of a preferred form of my invention with the cover shown wide open;

Fig. 2 is a bottom plan view of the compact;

Fig. 3 is an edge view of the compact;

Fig. 4 is a plan view drawn to smaller scale and showing the compact in closed condition;

Fig. 5 is a section taken in the plane of the line 5—5 of Fig. 4, but drawn to enlarged scale;

Fig. 6 is a plan view of a spring forming a part of the invention;

Fig. 7 is a side elevation of the same;

Fig. 8 is a view similar to Fig. 1 but showing a compact which is square in outline; and Fig. 9 is a side elevation of the same.

Referring to the drawing, and more particularly to Figs. 1-5, the compact comprises a casing 12 having a cover 14 hinged at 16. The casing has a powder compartment 18 (Fig. 5) and powder delivery mechanism including a pressure plate 20 and a spring 22, the plate bearing upwardly against the powder in the compartment. The oscillatable feed plate or agitator is shown at 24 (Figs. 1 and 5) and is located directly beneath and preferably in intimate contact with an apertured powder delivery platform 26. The agitator is operated by means of a handle 28 which projects at one side of the casing.

The cover 14 has a peripheral wall 30, and a part of this wall is employed as a lock means to hold the handle 28 against accidental or unintended movement. More specifically, the peripheral wall 30 is extended downwardly at 32 (Fig. 3) into the path of travel of the handle 28. However, the part 32 is cut away at one or more points, here shown at 34 and 36, to receive the handle. It will thus be evident that the handle is locked against accidental movement when the cover is closed, and is automatically released when the cover is open.

From inspection of the locking slot at 34 in Fig. 3 (or 98 in Fig. 9) it will be seen that when considered more precisely, the specific lock means there shown is partly carried by the cover and partly by the casing. The part carried by the cover comes down to and cooperates with the part carried by the casing, in addition to engaging and holding the handle against agitator movement when the cover is closed, although not when the cover is opened.

Considering the arrangement in greater detail, and referring more particularly to Fig. 5, the casing 12 is made up of an annular bottom section having an outer side wall 38 and an inner side wall 40 connected by an annular bottom wall 42. The inner wall 40 is cylindrical and defines the loose powder container of the compact. Powder may be loaded into the container by inverting the compact and opening a bottom door 44. Referring to Fig. 2 it will be seen that the door 44 is hinged at 46, and held in closed position by means of a lock 48 which slides over a tab 50 formed integrally with door 44. By sliding the lock 48 downward slightly the cover 44 is freed, and it springs open because of the main feed spring 22 which is located just inside the cover.

Reverting to Fig. 5, the powder in the space 18 is urged upward by a pressure plate 20, which in turn is pushed upward by the spring 22 located between the door 44 and the plate 20. It is convenient to secure the plate to the spring, and to secure the spring to the door, so that when the door is opened the entire assembly comes out of the powder compartment. In the present case the spring takes a form best shown in Figs. 6 and 7 of the drawing, it being stamped out of resilient sheet metal, and comprising a flat base portion including a peripheral frame 52 with a spoke 54, the latter being riveted at 56 to the door 44. Just within the frame portion 52 there is a first offset spring portion 58, which is in the form of an inverted U, but with its ends joining the base portion at 60 instead of being free. Within the spring portion 58 there is a second spring portion consisting of the spaced arms 62. The free ends of these arms are secured to the pressure plate 20, as by passing the same through incisions formed in the pressure plate and then compressing the straps of metal 64 (Fig. 7) left between the incisions. The spring portions 62 and 58 are angularly offset from each other and from the base portion 52, as is best shown in Fig. 7, thereby affording the desired spring pressure when confined in the small space left at the bottom of the powder compartment. It will be understood that the nature of this spring is such as to permit the pressure plate to enter or leave the powder compartment when the door is closed or opened, although the pressure plate is a circular disc accurately fitting the powder compartment. At the same time the force exerted by the spring is centered or equalized so that the pressure exerted on the powder is uniform over the entire area of the plate.

The lower half of the compact is enclosed by means of a stationary plate or so-called "platform" 26 (Figs. 1 and 5). This is preferably slightly concave in order to more readily receive and center a powder puff, not shown, and to help confine the powder delivered from the subjacent compartment so that the powder may be taken up on the puff. The periphery of platform 26 is flanged in downward direction, as shown at 66 in Fig. 5, the said flange fitting snugly within the peripheral wall 38 of the bottom. The assembly of the platform 26 with the bottom holds the agitator 24 therebetween.

The agitator is a circular member having a peripheral flange 68 which fits accurately around the powder container wall 40. The handle 28 is mounted at the end of a radial arm 70 which is secured to, or more preferably formed integrally with, the agitator 24. It will thus be evident that movement of the handle 28 back and forth between the points 28 and 28' in Fig. 1 correspondingly oscillates the agitator 24. The agitator has openings which sweep past small delivery apertures 72 in the platform 26 and thus release a limited amount of powder above the platform. The delivery apertures may be narrow radial slits, as shown in Fig. 1.

The apertures in the agitator 24, however, may be large, and preferably are diamond-shaped and of considerable area, as shown at 74 in Fig. 1. These openings preferably extend substantially to the periphery of the agitator, even though the delivery slits 72 of the platform may be located near the center of the platform. In effect the openings add up to a somewhat star-shape, and tend to feed powder radially inward. This is in addition to the main function of sweeping a mass of the powder bodily around. The operation seems to slice small measured lines of powder from the main body, and to deliver the same on the platform. This is done with surprising precision and dependability, so that the user soon comes to know the relation between the number of movements given to the handle, and the amount of powder delivered in consequence.

I have found that there is a tendency for the powder to compact so hard that the agitator tends to rotate the entire body of powder, which in turn tends to rotate the pressure plate if the latter is not held against rotation. If all of the parts are permitted to rotate in unison the device does not function as well as when the powder is restrained by a stationary pressure plate while the agitator moves. To help insure this result the rivet 56 (Fig. 2) which fastens the spring 22 (Fig. 5) to the door 44, is supplemented by mating polygonal depressions which prevent rotation. More specifically, the door 44 has a hexagonal depression 76 (Fig. 2) surrounding the rivet 56. The spoke portion 54 (Fig. 6) of the spring has a similar hexagonal portion 78. These parts mate when riveted together by the rivet 56, and so prevent rotation of the spring, which in turn prevents rotation of the pressure plate.

As so far described the compact is operative, but if desired may additionally be provided with sealing rings. Reverting to Fig. 5, the compact may be provided with a pair of somewhat resilient rings 80 and 82. More specifically, there is a felt ring 80 surrounding the powder compartment and located beneath the arm 70 of handle 28. There is a second felt ring 82 disposed about the periphery of the agitator and above the arm 70. These rings come into face-to-face contact, except at the arm 70 where they yield slightly to receive the arm. In other words, the arm is embedded between the felt rings, and the latter tend to turn with the arm when the arm is operated. These felt rings, while not essential, are a precaution to help seal against possibility of escape of powder between the agitator and the platform, or between the agitator and the container, which powder might work itself around to the edge of the compact and escape at the side where the arm 70 of the handle has access to the outside. It will be understood that when the compact is open the arm 70 operates in a horizontal slot 84, which is defined by the upper edge of the peripheral wall 38 of the bottom, and by the lower edge of the peripheral wall 66 of the platform. Both of these are cut away for the desired arc of movement, here indicated between the points 28 and 28' of Fig. 1.

The compact is completed by the provision of a mirror 86 inside the cover, the mirror being held in position by a suitable bezel 88. The compact may be held closed by a lock, here illustrated as having a detent 90 (Fig. 1) resiliently urged outward but which may be pushed in by a finger piece 92. This lock may be conventional, and forms no novel part of the present invention.

It will be understood that the compact need not be circular in outline. A modification which is square in outline is shown in Figs. 8 and 9 of the drawing. Although the base, cover, and platform are all square in outline, the powder compartment itself is circular, as before, and the bottom door, the pressure plate, the agitator, and the felt rings are all circular, as previously described. The handle 94 similarly moves in a circular path about the center of the compact. However, in this case it will be seen that the handle projects a substantial distance from the edge of the compact when in center position, as shown in Fig. 8, but moves to the edge of the compact when at either end of its travel, as shown at 94' in Fig. 8. Thus the handle is easily operated, yet is nested close to the compact when not in use. Here again the side wall of the cover is carried downward, as shown at 96 in Fig. 9, and lies in the path of travel of the operating handle. The side wall is cut away at both ends, as indicated at 98, and thus serves to lock the handle against movement at either end of its travel. In other respects the compact may be like that previously described.

It is believed that the construction and operation of my improved powder dispensing compact, as well as the advantages thereof, will be apparent from the foregoing detailed description. It will also be apparent that while I have shown and described my invention in several preferred forms, changes may be made in the structures shown, without departing from the scope of the invention as sought to be defined in the following claims.

I claim:

1. A lady's loose powder compact comprising a casing having a hinged cover with a peripheral wall, a powder compartment in the casing, powder delivery mechanism including a spring and a pressure plate bearing upwardly against the powder in the compartment, an oscillatable agitator, an apertured powder delivery platform above the agitator, and a handle exposed at the side of the casing to oscillate the agitator, the edge wall of the cover projecting downwardly into the path of travel of the handle, but being cut away at one or more points to receive the handle, and thereby locking the handle against accidental or unintended movement when the cover is closed, the arrangement being such that opening of the cover automatically releases the handle for movement of the agitator.

2. A lady's powder compact as defined in claim 1, in which the casing and cover are rectangular in outline and the handle is of such length that it projects from one side of the casing when in the center of its motion but comes against the side of the casing at the ends of its motion, and in which the edge wall of the cover projects downwardly into the path of travel of the handle, except at the ends of the travel where space is provided to receive the handle, so that the cover locks the handle at either end of its travel where it is close to the side of the casing.

3. A lady's loose powder compact comprising a casing having a hinged cover with a peripheral wall, a powder compartment in the casing, powder delivery mechanism including a spring and a pressure plate bearing upwardly against the powder in the compartment, an oscillatable agitator, an apertured powder delivery platform above the agitator, a handle exposed at the side of the casing to oscillate the agitator, and lock means for holding the handle against movement, said lock means being formed on the peripheral wall of the cover and thereby locking the handle against accidental or unintended movement when the cover is closed, but releasing the handle for movement when the cover is opened, said casing and cover being rectangular in outline, and the handle being of such length that it projects from one side of the casing when in the center of its motion but comes against the side of the casing at the ends of its motion, and the aforesaid lock means serving to lock the handle at either end of its travel where it is close to the side of the casing.

4. A lady's loose powder compact comprising a casing, a powder compartment in the casing, powder delivery mechanism including a movable agitator, a movable handle exposed at the side of the casing to move the agitator, a cover hinged on said casing for movement to said casing to close the same and away from said casing to open the same, and lock means at least a part of which is carried by said hinged cover for coming down to and cooperating with a part carried by the casing for engaging and holding the handle against agitator movement when the cover is closed, but not when the cover is opened.

5. A lady's loose powder compact comprising a casing, a powder compartment in the casing, powder delivery mechanism including a spring and a pressure plate bearing upwardly against the powder in the compartment, an oscillatable agitator, an apertured powder delivery platform above the agitator, a movable handle exposed at the side of the casing to oscillate the agitator, a cover hinged on said casing for movement to said casing to close the same and away from said casing to open the same, and lock means at least a part of which is carried by said hinged cover for coming down to and cooperating with a part carried by the casing for engaging and holding the handle against accidental or unintended agitator movement when the cover is closed, but not when the cover is opened.

6. A lady's powder compact as defined in claim 5, in which the casing and cover are rectangular in outline and the handle is of such length that it projects from one side of the casing when in the center of its motion but comes against the side of the casing at the ends of its motion, and in which the lock means serves to lock the handle at either end of its travel where it is close to the side of the casing.

7. A lady's loose powder compact comprising a casing, a powder compartment in the casing, powder delivery mechanism including a movable agitator, a movable handle exposed at the side of the casing to move the agitator, a cover hinged on said casing for movement to said casing to close the same and away from said casing to open the same, and lock means carried by said hinged cover for coming down to and engaging and holding the handle against agitator movement when the cover is closed, but leaving and thereby disengaging and freeing the handle for agitator movement when the cover is opened.

8. A lady's loose powder compact comprising a casing, a powder compartment in the casing, powder delivery mechanism including a spring and a pressure plate bearing upwardly against the powder in the compartment, an oscillatable agitator, an apertured powder delivery platform above the agitator, a movable handle exposed at the side of the casing to oscillate the agitator, a cover hinged on said casing for movement to said casing to close the same and away from said casing to open the same, and lock means carried by said hinged cover for holding the handle against agitator movement, said lock means coming down to and engaging and holding the handle against accidental or unintended agitator movement when the cover is closed, but leaving and thereby disengaging and releasing the handle for agitator movement when the cover is opened.

References Cited in the file of this patent

UNITED STATES PATENTS

| 1,552,173 | Krag | Sept. 1, 1925 |
| 1,668,658 | Reutter | May 8, 1928 |
| 1,804,943 | Maillard | May 12, 1931 |
| 1,866,576 | Neiman | July 12, 1932 |

FOREIGN PATENTS

| 38,633 | France | Mar. 24, 1931 |
| 723,214 | France | Jan. 12, 1932 |